(12) United States Patent
Hamel et al.

(10) Patent No.: US 10,000,293 B2
(45) Date of Patent: Jun. 19, 2018

(54) GAS-ELECTRIC PROPULSION SYSTEM FOR AN AIRCRAFT

(71) Applicant: General Electric Company, Schenectady, NY (US)

(72) Inventors: Jeffrey Anthony Hamel, Maineville, OH (US); Kurt David Murrow, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 0 days. days.

(21) Appl. No.: 14/969,640

(22) Filed: Dec. 15, 2015

(65) Prior Publication Data

US 2016/0214727 A1    Jul. 28, 2016

Related U.S. Application Data

(60) Provisional application No. 62/107,196, filed on Jan. 23, 2015.

(51) Int. Cl.
*B64D 27/24* (2006.01)
*B64C 21/06* (2006.01)
(Continued)

(52) U.S. Cl.
CPC .............. *B64D 27/24* (2013.01); *B64C 21/06* (2013.01); *B64D 27/18* (2013.01); *B64D 27/20* (2013.01);
(Continued)

(58) Field of Classification Search
CPC ...................................................... B64D 27/24
See application file for complete search history.

(56) References Cited

U.S. PATENT DOCUMENTS

| 2,462,201 A | 2/1949 | Kilgore et al. |
| 2,812,912 A | 11/1957 | Stevens et al. |

(Continued)

FOREIGN PATENT DOCUMENTS

| EP | 2581308 A2 | 4/2013 |
| GB | 1024894 A | 4/1966 |

(Continued)

OTHER PUBLICATIONS

European Search Report and Opinion issued in connection with corresponding EP Application No. 16152115.8 dated Jun. 9, 2016.

(Continued)

*Primary Examiner* — Brian M O'Hara
(74) *Attorney, Agent, or Firm* — General Electric Company; Pamela A. Kachur

(57) ABSTRACT

In one aspect the present subject matter is directed to a gas-electric propulsion system for an aircraft. The system may include a turbofan jet engine, an electric powered boundary layer ingestion fan that is coupled to a fuselage portion of the aircraft aft of the turbofan jet engine, and an electric generator that is electronically coupled to the turbofan jet engine and to the boundary layer ingestion fan. The electric generator converts rotational energy from the turbofan jet engine to electrical energy and provides at least a portion of the electrical energy to the boundary layer ingestion fan. In another aspect of the present subject matter, a method for propelling an aircraft via the gas-electric propulsion system is disclosed.

24 Claims, 4 Drawing Sheets

(51) Int. Cl.
 *B64D 27/20* (2006.01)
 *B64D 27/18* (2006.01)
 *B64D 27/02* (2006.01)

(52) U.S. Cl.
 CPC .... *B64D 2027/026* (2013.01); *B64D 2205/00* (2013.01); *Y02T 50/166* (2013.01); *Y02T 50/62* (2013.01); *Y10S 903/905* (2013.01); *Y10S 903/906* (2013.01); *Y10S 903/907* (2013.01)

(56) References Cited

U.S. PATENT DOCUMENTS

| | | |
|---|---|---|
| 3,194,516 A | 7/1965 | Messerschmitt |
| 3,286,470 A | 11/1966 | Gerlaugh |
| 3,312,448 A | 4/1967 | Huil, Jr. et al. |
| 3,844,110 A | 10/1974 | Widlansky et al. |
| 4,089,493 A | 5/1978 | Paulson |
| 4,370,560 A | 1/1983 | Faulkner et al. |
| 4,605,185 A | 8/1986 | Reyes |
| 4,913,380 A | 4/1990 | Vardaman et al. |
| 5,174,109 A | 12/1992 | Lampe |
| 5,799,484 A | 9/1998 | Nims |
| 5,927,644 A | 7/1999 | Ellis et al. |
| 6,105,697 A | 8/2000 | Weaver |
| 6,169,332 B1 | 1/2001 | Taylor et al. |
| 6,545,373 B1 | 4/2003 | Andres et al. |
| 6,834,831 B2 | 12/2004 | Daggett |
| 6,976,655 B2 | 12/2005 | Thompson |
| 6,992,403 B1 | 1/2006 | Raad |
| 7,251,942 B2 | 8/2007 | Dittmar et al. |
| 7,267,300 B2 | 9/2007 | Heath et al. |
| 7,285,871 B2 | 10/2007 | Derouineau |
| 7,380,749 B2 | 6/2008 | Fucke et al. |
| 7,387,189 B2 | 6/2008 | James et al. |
| 7,417,337 B1 | 8/2008 | Suttie |
| 7,493,754 B2 | 2/2009 | Moniz et al. |
| 7,495,354 B2 | 2/2009 | Herrmann |
| 7,514,810 B2 | 4/2009 | Kern et al. |
| 7,665,689 B2 | 2/2010 | McComb |
| 7,677,502 B2 | 3/2010 | Lawson et al. |
| 7,752,834 B2 | 7/2010 | Addis |
| 7,806,363 B2 | 10/2010 | Udall et al. |
| 7,818,969 B1 | 10/2010 | Hotto |
| 7,819,358 B2 | 10/2010 | Belleville |
| 7,905,449 B2 | 3/2011 | Cazals et al. |
| 7,952,244 B2 | 5/2011 | Colin |
| 7,958,727 B2 | 6/2011 | Arnold |
| 7,970,497 B2 | 6/2011 | Derouineau et al. |
| 7,976,273 B2 | 7/2011 | Suciu et al. |
| 8,033,094 B2 | 10/2011 | Suciu et al. |
| 8,039,983 B2 | 10/2011 | Cote et al. |
| 8,109,073 B2 | 2/2012 | Foster et al. |
| 8,128,019 B2 | 3/2012 | Annati et al. |
| 8,141,360 B1 | 3/2012 | Huber |
| 8,162,254 B2 | 4/2012 | Roche |
| 8,193,761 B1 | 6/2012 | Singh |
| 8,220,739 B2 | 7/2012 | Cazals |
| 8,226,040 B2 | 7/2012 | Neto |
| 8,317,126 B2 | 11/2012 | Harris et al. |
| 8,432,048 B1 | 4/2013 | Paulino |
| 8,469,306 B2 | 6/2013 | Kuhn, Jr. |
| 8,489,246 B2 | 7/2013 | Dooley |
| 8,492,920 B2 | 7/2013 | Huang et al. |
| 8,522,522 B2 | 9/2013 | Poisson |
| 8,549,833 B2 | 10/2013 | Hyde et al. |
| 8,552,575 B2 | 10/2013 | Teets et al. |
| 8,568,938 B2 | 10/2013 | Gao et al. |
| 8,631,657 B2 | 1/2014 | Hagen et al. |
| 8,640,439 B2 | 2/2014 | Hoffjann et al. |
| 8,657,227 B1 | 2/2014 | Bayliss et al. |
| 8,672,263 B2 | 3/2014 | Stolte |
| 8,684,304 B2 | 4/2014 | Burns et al. |
| 8,692,489 B2 | 4/2014 | Maalioune |
| 8,708,274 B2 | 4/2014 | Lord |
| 8,720,814 B2 | 5/2014 | Smith |
| 8,723,385 B2 | 5/2014 | Jia et al. |
| 8,742,605 B1 | 6/2014 | Wilhide et al. |
| 8,836,160 B1 | 9/2014 | Paterson et al. |
| 8,890,343 B2 | 11/2014 | Bulin et al. |
| 8,925,660 B2 | 1/2015 | Bowdich et al. |
| 8,928,166 B2 | 1/2015 | Seger et al. |
| 8,939,399 B2 | 1/2015 | Kouros et al. |
| 8,957,539 B1 | 2/2015 | Ralston |
| 8,997,493 B2 | 4/2015 | Brust et al. |
| 8,998,580 B2 | 4/2015 | Quiroz-Hernandez |
| 9,004,849 B2 | 4/2015 | Munsell et al. |
| 9,038,398 B2 | 5/2015 | Suciu et al. |
| 9,045,996 B2 | 6/2015 | Anghel et al. |
| 9,068,562 B1 | 6/2015 | Budica et al. |
| 9,143,023 B1 | 9/2015 | Uskert |
| 9,190,892 B2 | 11/2015 | Anthony |
| 2006/0037325 A1 | 2/2006 | Peters et al. |
| 2008/0056892 A1 | 3/2008 | Barton et al. |
| 2009/0179424 A1 | 7/2009 | Yaron |
| 2010/0038473 A1 | 2/2010 | Schneider et al. |
| 2010/0083669 A1* | 4/2010 | Foster ............... F02C 6/18 60/802 |
| 2011/0016882 A1 | 1/2011 | Woelke et al. |
| 2012/0153076 A1 | 6/2012 | Burns et al. |
| 2012/0209456 A1 | 8/2012 | Harmon et al. |
| 2012/0214605 A1 | 8/2012 | Snook et al. |
| 2013/0032215 A1 | 2/2013 | Streifinger |
| 2013/0036730 A1 | 2/2013 | Bruno et al. |
| 2013/0052005 A1 | 2/2013 | Cloft |
| 2013/0062885 A1 | 3/2013 | Taneja |
| 2013/0094963 A1* | 4/2013 | Rolt ............... B64D 27/02 416/1 |
| 2013/0099065 A1 | 4/2013 | Stuhlberger |
| 2013/0139515 A1 | 6/2013 | Schlak |
| 2013/0184958 A1 | 7/2013 | Dyrla et al. |
| 2013/0227950 A1 | 9/2013 | Anderson et al. |
| 2013/0251525 A1 | 9/2013 | Saiz |
| 2013/0306024 A1 | 11/2013 | Rolt |
| 2014/0010652 A1 | 1/2014 | Suntharalingam et al. |
| 2014/0084677 A1 | 3/2014 | Haillot |
| 2014/0250861 A1 | 9/2014 | Eames |
| 2014/0252161 A1 | 9/2014 | Gukeisen |
| 2014/0271114 A1 | 9/2014 | Phillips et al. |
| 2014/0283519 A1 | 9/2014 | Mariotto et al. |
| 2014/0290208 A1 | 10/2014 | Rechain et al. |
| 2014/0338352 A1 | 11/2014 | Edwards et al. |
| 2014/0339371 A1 | 11/2014 | Yates et al. |
| 2014/0345281 A1 | 11/2014 | Galbraith |
| 2014/0346283 A1 | 11/2014 | Salyer |
| 2014/0367510 A1 | 12/2014 | Viala et al. |
| 2014/0367525 A1 | 12/2014 | Salyer |
| 2014/0369810 A1 | 12/2014 | Binks et al. |
| 2015/0005990 A1 | 1/2015 | Burns et al. |
| 2015/0013306 A1 | 1/2015 | Shelley |
| 2015/0028594 A1 | 1/2015 | Mariotto |
| 2015/0084558 A1 | 3/2015 | Benson et al. |
| 2015/0084561 A1 | 3/2015 | Benson et al. |
| 2015/0084565 A1 | 3/2015 | Le Peuvedic |
| 2015/0089921 A1 | 4/2015 | Rideau et al. |
| 2015/0104310 A1 | 4/2015 | Griffin |
| 2015/0113996 A1 | 4/2015 | Cai et al. |
| 2015/0115108 A1 | 4/2015 | Benson et al. |
| 2015/0148993 A1 | 5/2015 | Anton et al. |
| 2015/0151844 A1 | 6/2015 | Anton et al. |
| 2015/0151847 A1 | 6/2015 | Krug et al. |
| 2015/0159552 A1 | 6/2015 | Rodriguez et al. |
| 2015/0183522 A1 | 7/2015 | Ouellette |
| 2015/0291285 A1* | 10/2015 | Gallet ............... F01D 13/02 415/60 |
| 2015/0380999 A1 | 12/2015 | Joshi et al. |
| 2016/0061053 A1 | 3/2016 | Thomassin |
| 2016/0214717 A1 | 7/2016 | De Silva |
| 2016/0257416 A1 | 9/2016 | Himmelmann et al. |

(56) References Cited

U.S. PATENT DOCUMENTS

2016/0340051 A1  11/2016  Edwards et al.
2016/0355272 A1  12/2016  Moxon

FOREIGN PATENT DOCUMENTS

| GB | 2400411 A | 10/2004 |
| --- | --- | --- |
| GB | 2489311 A | 9/2012 |
| WO | 2010020199 A1 | 2/2010 |
| WO | 2014072615 A1 | 5/2014 |
| WO | 2014123740 A1 | 8/2014 |

OTHER PUBLICATIONS

Schramm, "Damping of Torsional Interaction Effects in Power Systems", pp. 1-132, 2010.

Bradley et al., "Subsonic Ultra Green Aircraft Research, Phase II: N+4 Advanced Concept Development", NASA/CR-2012-217556, pp. 1-148, May 2012.

"Boeing Researches Alternative Propulsion and Fuel Options", http://aviationweek.com/awin/boeing-researches-alternative-propulsion-and-fuel-options, Aviation Week & Space Technology, pp. 1-5, Jun. 4, 2012.

U.S. Non-Final Office Action issued in connection with Related U.S. Appl. No. 15/245,257 dated Feb. 16, 2017.

GR Related Case Form.

\* cited by examiner

GAS-ELECTRIC PROPULSION SYSTEM FOR AN AIRCRAFT

CROSS-REFERENCE TO RELATED APPLICATIONS

This non-provisional application claims the benefit of priority under 35 U.S.C. § 119(e) to U.S. Provisional Patent Application No. 62/107,196, entitled "GAS-ELECTRIC PROPULSION SYSTEM FOR AN AIRCRAFT", filed Jan. 23, 2015, which is herein incorporated in its entirety by reference.

FIELD OF THE INVENTION

The present subject matter relates generally to a gas-electric propulsion system for an aircraft. More particularly, the present subject matter relates to a gas-electric propulsion system that converts rotational energy from a gas powered aircraft engine into electric energy via a low pressure (LP) and/or a high pressure (HP) electric generator to drive an electric powered boundary layer ingestion fan.

BACKGROUND OF THE INVENTION

A conventional commercial aircraft has a fuselage (tube) and wing configuration, and a propulsion system that provides thrust. The propulsion system generally includes two or more jet engines such as turbofans. The jet engines may be mounted to the aircraft in a variety of ways. For example, the jet engines may be suspended beneath the wing, blended with the wing or mounted directly to the fuselage. The jet engines are typically installed at a distance from the fuselage and/or the wing, such that the jet engines and the fuselage interact with separate freestream airflows, thus reducing turbulence of air entering an inlet portion of the jet engine. The net propulsive thrust of the jet engines is directly proportional to the difference between jet engine exhaust velocity and freestream velocity of the air approaching the engine while in motion.

Drag, such as skin friction, form and induced drag have a direct effect on net propulsive thrust of the propulsion system. Total aircraft drag is generally proportional to a difference between freestream velocity of air approaching the aircraft and an average velocity of a wake downstream from the aircraft and that is produced due to the drag on the aircraft. Various parameters of the jet engine such as jet engine diameter, thrust capability, fan pressure ratio (FPR) for a turbofan jet engine and/or jet engine exhaust velocity must be sized and/or designed to accommodate for the total aircraft drag.

Systems and/or technics have been proposed to counter the effects of drag and/or to improve efficiency of the jet engine. For example, various propulsion systems incorporate boundary layer ingestion systems such as one or more boundary layer ingestion fan(s) and/or related techniques that route a portion of relatively slow moving air which forms a boundary layer across the fuselage into the jet engine at or upstream from a fan section of the jet engine. While this technique reduces the net drag by re-energizing the boundary layer downstream from the aircraft, the flow of air from the boundary layer entering the jet engine generally has a non-uniform or distorted velocity profile. As a result, conventional turbofan jet engines, particularly those turbofans mounted under-wing, may experience loss of operability or efficiency, thus minimizing or negating the benefits of reduced drag on the aircraft.

Accordingly, a gas-electric propulsion system that reduces net drag on the aircraft while increasing overall propulsion system efficiency and/or that allows for reduced engine diameter and/or fan pressure ratio for wing-mounted turbofans would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a gas-electric propulsion system for an aircraft. The system includes a pair of jet engines suspended beneath a wing of the aircraft, an electric powered boundary layer ingestion fan coupled to a fuselage portion of the aircraft aft of the wing, and an electric generator that is electronically coupled to the pair of jet engines and to the boundary layer ingestion fan. The electric generator converts rotational energy from at least one jet engine of the pair of j et engines to electrical energy and provides at least a portion of the electrical energy to the boundary layer ingestion fan.

In another aspect, the present subject matter is directed to a gas-electric propulsion system for an aircraft. The system may include a turbofan jet engine, an electric powered boundary layer ingestion fan coupled to a fuselage portion of the aircraft aft of the turbofan jet engine, and an electric generator that is electronically coupled to the turbofan jet engine and to the boundary layer ingestion fan. The electric generator converts rotational energy from the turbofan jet engine to electrical energy and provides at least a portion of the electrical energy to the boundary layer ingestion fan.

In a further aspect, the present subject matter is directed to a method for propelling an aircraft via a gas-electric propulsion system. The method includes providing electrical energy from an energy storage device to an electric motor of a boundary layer ingestion fan where the boundary layer ingestion fan is mounted to the aircraft aft of a wing of the aircraft. The method further includes engaging an electric motor of the boundary layer ingestion fan to produce thrust sufficient to propel the aircraft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
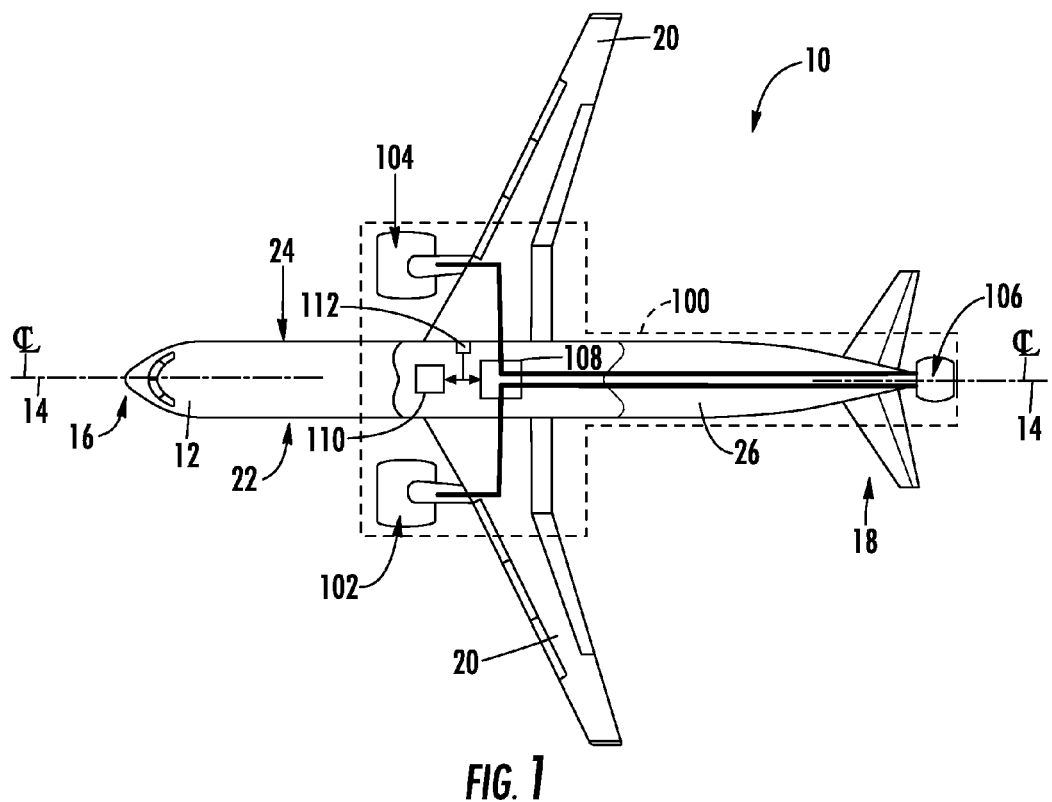
FIG. 1 is a top view of an exemplary aircraft as may incorporate various embodiments of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

In general, the present subject matter is directed to a gas-electric propulsion system for an aircraft such as but not limited to a conventional commercial aircraft. In various embodiments, the gas-electric propulsion system includes one or more jet engines such as turbofan engines (variable or fixed pitch, ducted or non-ducted, geared or direct drive) that utilize high pressure (HP) generators, low pressure (LP) generators, or any combination of (HP) and (LP) generators to distribute electric power generated by the turbofan engines to one or more electric powered Boundary Layer Ingestion (BLI) fan(s). In particular embodiments, energy storage devices such as batteries electronically coupled to the (LP) and/or (HP) generators may be used to aid in driving the BLI fan, thus providing thrust to the aircraft during particular operational modes.

In various embodiments, the BLI fan is sized to ingest a boundary layer of air flowing over the fuselage of the aircraft during flight, thereby reducing aircraft drag and enabling propulsive efficiency increases. In addition or in the alternative, the BLI fan may be used to generate additional thrust for the aircraft while in flight such as during takeoff, cruise and decent. As a result, the additional thrust in combination with reduced drag may afford a decrease in diameter and/or fan pressure ratio of the wing-mounted turbofans, thus increasing propulsive efficiency by reducing fuel burn. In addition or in the alternative, a decrease in diameter of the wing-mounted turbofans may minimize engine induced drag, thus further contributing to propulsive efficiency gains. In addition or in the alternative, the BLI fan may generate sufficient thrust to move the aircraft on the ground such as during taxi, thus reducing overall jet engine fuel burn.

Figure 2:
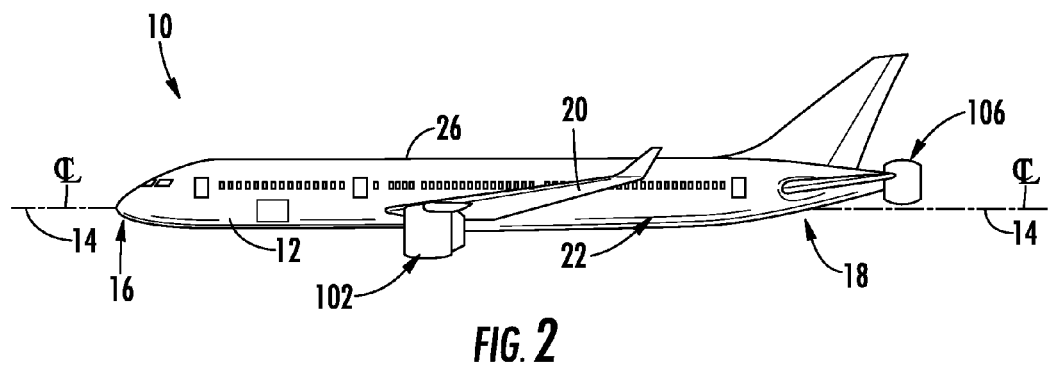
FIG. 2 is a port side view of the aircraft as illustrated in FIG. 1.

Referring now to the drawings, wherein identical numerals indicate the same elements throughout the figures, FIG. 1 provides a top view of an exemplary aircraft 10 as may incorporate various embodiments of the present invention. FIG. 2 provides a port side view of the aircraft 10 as illustrated in FIG. 1. As shown in FIGS. 1 and 2 collectively, the aircraft 10 includes a fuselage 12 having a longitudinal centerline 14 that extends therethrough. The fuselage 12 extends longitudinally between a forward or nose section 16 and an aft or tail section 18 of the aircraft 10. The aircraft 10 further includes a wing 20 that extends laterally outwardly with respect to the longitudinal centerline 14 from a port side 22 and from a starboard side 24 (FIG. 1) of the fuselage 12. The fuselage 12 includes an outer surface or skin 26.

In various embodiments, as shown in FIG. 1, the aircraft 10 includes a gas-electric propulsion system 100, herein referred to as "system 100". The system 100 includes a pair of jet engines 102, 104 suspended beneath the wing(s) 20 in an under-wing configuration and at least one Boundary Layer Ingestion (BLI) fan 106 mounted to the aircraft 10 aft of the wing 20 and/or the jet engines 102, 104. The BLI fan 106 may be fixedly connected to the fuselage 12 at any point that is aft from the wing 20 and/or the jet engines 102, 104. For example, in particular embodiments, as shown in FIGS. 1 and 2, the BLI fan 106 may be fixedly connected to the fuselage aft of the tail section 18. However, it should be appreciated that in alternate embodiments, the BLI fan 106 may be positioned forward of the tail section 18 or may be incorporated into or blended with the tail section 18.

Figure 3:
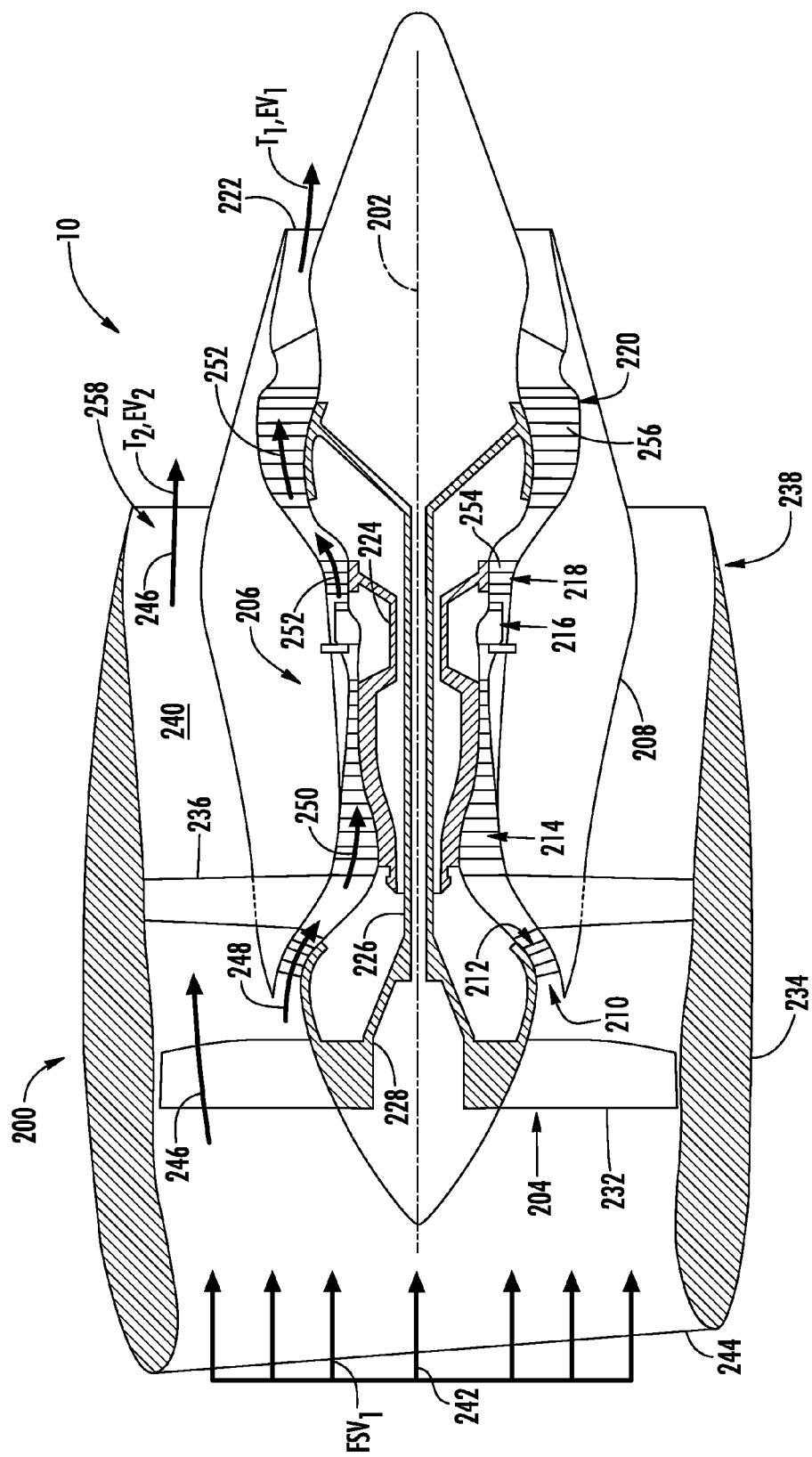
FIG. 3 is a schematic cross-sectional view of an exemplary high-bypass turbofan jet engine according to various embodiments of the present subject matter.

In various embodiments, the jet engines 102, 104 are high-bypass turbofan jet engines. FIG. 3 is a schematic cross-sectional view of an exemplary high-bypass turbofan jet engine 200 herein referred to as "turbofan 200" and in various embodiments, may be representative of jet engines 102, 104. As shown in FIG. 3, the turbofan 200 has a longitudinal or axial centerline axis 202 that extends therethrough for reference purposes. In general, the turbofan 200 may include a fan section 204 and a gas-powered core turbine engine 206 disposed downstream from the fan section 204.

Figure 5:
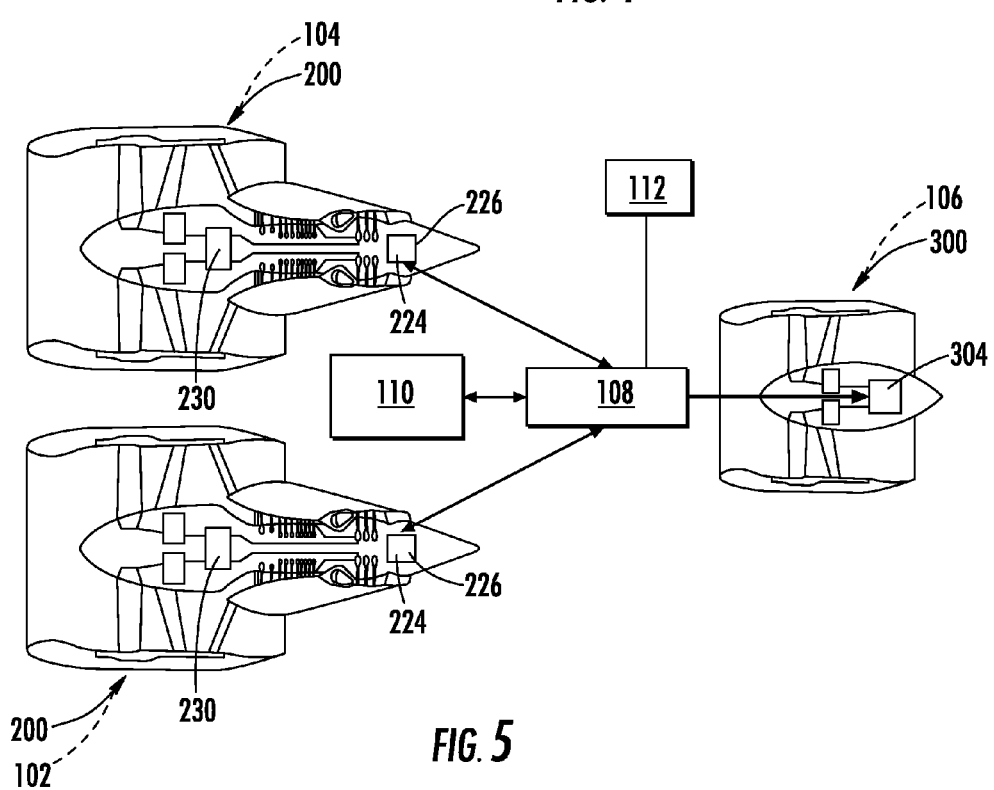
FIG. 5 is a schematic view of an exemplary gas-electric propulsion system, according to various embodiments of the present invention.

The core turbine engine 206 may generally include a substantially tubular outer casing 208 that defines an annular inlet 210. The outer casing 208 encases, in serial flow relationship, a booster or low pressure (LP) compressor 212, a high pressure (HP) compressor 214, a combustion section 216, a high pressure (HP) turbine 218, a low pressure (LP) turbine 220 and a jet exhaust section 222. A high pressure (HP) shaft or spool 224 drivingly connects the HP turbine 218 to the HP compressor 214 and a low pressure (LP) shaft or spool 226 drivingly connects the LP turbine 220 to the LP compressor 212. The (LP) shaft or spool 226 may also be connected to a fan spool or shaft 228 of the fan section 204. In particular embodiments, as shown in FIG. 3, the (LP) shaft or spool 226 may be connected directly to the fan spool 228 such as in a direct-drive configuration. In alternative embodiments, as shown in FIG. 5 and described in more detail below, the (LP) shaft or spool 226 may be connected to the fan spool 228 via a reduction gear 230 such as in an indirect-drive or geared-drive configuration.

As shown in FIG. 3, the fan section 204 includes a plurality of fan blades 232 that are coupled to and that extend radially outwardly from the fan spool 228. An annular fan casing or nacelle 234 circumferentially surrounds the fan section 204. It should be appreciated by those of ordinary skill in the art that the nacelle 234 may be configured to be supported relative to the core turbine engine 206 by a plurality of circumferentially-spaced outlet guide vanes 236. Moreover, a downstream section 238 of the nacelle 234 may extend over an outer portion of the core turbine engine 206 so as to define a bypass airflow passage 240.

During operation of the turbofan 200, a volume of air 242 enters the turbofan 200 through an associated inlet 244 of the nacelle 234 and/or fan section 204 at a freestream velocity FSVi. The volume of air 242 then passes through the fan blades 232 and is split into a first volume of air as indicated by arrow 246 that moves through the bypass airflow passage 240 and a second volume of air indicated by arrow 248 which enters the booster or LP compressor 212. The ratio between the first volume of air 246 and the second volume of air 248 is commonly known as Fan Pressure Ration or FPR. The pressure of the second volume of air 248 is then increased as it is routed towards the high pressure (HP) compressor 214 (as indicated by arrow 250). The second volume of air 250 is routed from the HP compressor 214 into the combustion section 216 where it is mixed with fuel and burned to provide combustion gases 252.

The combustion gases 252 are routed through the HP turbine 218 where a portion of thermal and/or kinetic energy from the combustion gases 252 is extracted via various stages of HP turbine rotor blades 254 that are coupled to the HP shaft or spool 224, thus causing the HP shaft or spool 224 to rotate, thereby supporting operation of the HP compressor 214. The combustion gases 252 are then routed through the LP turbine 220 where a second portion of thermal and kinetic energy is extracted from the combustion gases 252 via various stages of LP turbine rotor blades 256 that are coupled to the LP shaft or spool 226, thus causing the LP shaft or spool 226 to rotate, thereby supporting operation of the LP compressor 212 and/or rotation of the fan spool or shaft 228. The combustion gases 252 are then routed through jet exhaust nozzle section 222 of the core turbine engine 206 to provide a first propulsive thrust $T_1$ at a first exhaust velocity $EV_1$ of the turbofan 200. Simultaneously, the pressure of the first volume of air 246 is substantially increased as the first volume of air 246 is routed through the bypass airflow passage 240 before it is exhausted therefrom at a second exhaust velocity $EV_2$ via a fan nozzle exhaust section 258 of the turbofan 200, thus providing a second propulsive thrust $T_2$.

Figure 4:
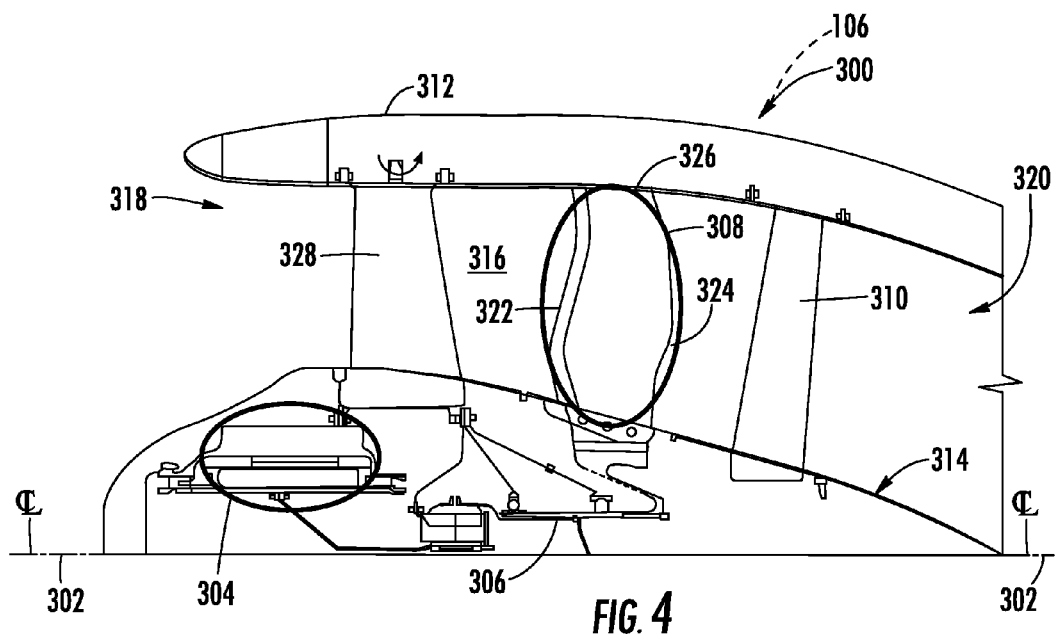
FIG. 4 is a schematic cross-sectional side view of an exemplary boundary layer ingestion (BLI) fan according to various embodiments of the present subject matter.

FIG. 4 provides a schematic cross-sectional side view of an exemplary BLI fan 300 and in various embodiments may be representative of BLI fan 106. As shown in FIG. 4, the BLI fan 300 has a longitudinal or axial centerline axis 302 that extends therethrough for reference purposes. In general, the BLI fan 300 includes an electric motor 304, a rotor shaft 306 coupled to the electric motor 304, a plurality of fan blades 308 coupled to the rotor shaft 306 and one or more stages of stator or support vanes 310. In particular embodiments, the BLI fan 300 may include an outer casing or nacelle 312 and an inner casing 314. A fan duct or flow passage 316 is at least partially defined between the nacelle 312 and the inner casing 314. The outer casing 312 may at least partially surround any one or more of the electric motor 304, the rotor shaft 306, the fan blades 308, the stator vanes 310, the inner casing 314 or other components of the BLI fan 300. The outer casing 312 at least partially defines an inlet 318 and an outlet to the fan duct 316.

In various embodiments, the inlet 318 is oriented with respect to the fuselage to ingest at least a portion of a boundary layer flow of air that is formed along the outer surface or skin 26 (FIGS. 1 and 2) of the fuselage 12 during flight. In particular embodiments, the inlet 318 is sized and/or shaped to optimize ingestion of the boundary layer flow of air. In addition, in various embodiments, the outlet 320 of the fan duct 316 is sized and/or shaped to provide maximum rearward thrust from the BLI fan 300, thus supplementing thrust provided by the jet engines 102, 104 and/or thereby providing sufficient thrust to independently propel or move the aircraft 10 in flight or while on the ground.

The electric motor 304 may be any electric motor that has a suitable specific power or weight to power ratio that is suitable for aviation use and its intended purpose. For example, in various embodiments, the electric motor 304 may be a superconducting electric motor. In particular embodiments, the electric motor 304 may have an efficiency of greater than 0.995, an output of approximately 3000 horsepower and a specific power of approximately 5-6 horsepower per pound weight. In particular embodiments, the electric motor 304 may be either a direct current (DC) motor or an alternating current (AC) motor.

The fan blades 308 may be formed from any material suitable for use in a flight environment. In particular embodiments, the fan blades 308 are at least partially formed from a composite material. In particular embodiments, as shown in FIG. 4, the fan blades 308 may include a metal alloy leading edge 322 and/or trailing edge 324. For example, in one embodiment at least one of the leading edge 322 and the trailing edge 324 includes a titanium alloy portion. In particular embodiments, the fan blades 308 may include sculpted features or surfaces 326. The sculpted features or surfaces 326 of the fan blades 308 may be formed to minimize associated fan blade noise.

In various embodiments, the BLI fan 300 may include at least one stage or row of inlet or stator vanes 328 that extend radially between the inner casing 314 and the fan nacelle 312 within the fan duct or flow passage 316 upstream from the fan blades 308. In particular embodiments, the stator vanes 328 may be fixed in position. In other embodiments, the stators vanes 326 may be variable or adjustable so as to affect a flow of air and/or the boundary layer air flowing into the inlet 318.

FIG. 5 provides a schematic view of the gas-electric propulsion system 100 or system 100, according to various embodiments of the present invention. In various embodiments, as shown in FIG. 5, system 100 further includes an electric generator 108 coupled to one or both of the jet engines 102, 104 and to the BLI fan 106. In one embodiment, the electric generator 108 is a low pressure (LP) electric generator configured to convert rotational energy from the LP shaft(s) or spool(s) 226 of one or both jet engines of the pair of jet engines 102, 104. In one embodiment, the electric generator 108 is a high pressure (HP) electric generator that is configured to convert rotational energy from the HP shaft(s) or spool(s) 224 of one or both jet engines of the pair of jet engines 102, 104. The electric generator 108 may be a DC generator or an AC generator. The electric generator 108 may provide electric energy to the BLI fan 106 during various flight conditions. For example, the electric generator 108 may provide electrical energy to the BLI fan 106 during taxi, take off, cruise, decent and/or landing of the aircraft.

In various embodiments, as shown in FIG. 5, the system 100 may include an energy storage device 110 that is electronically coupled to the electric generator 108. In particular embodiments, the energy storage device 110 includes high capacity batteries. In various embodiments, the energy storage device 110 is configured to receive and store electrical energy from the electrical generator 108 and to provide the stored electrical energy to the BLI fan 106 when required. The energy storage device 110 may provide stored electric energy to the BLI fan 106 during particular flight conditions. For example, the energy storage device 110 may provide electrical energy to the BLI fan 106 during taxi, take off, cruise, decent and/or landing of the aircraft.

In various embodiments, as show in FIG. 5, the system 100 may further include an energy management system or controller 112. The energy management system 112 may be configured or programmed to monitor various system conditions. For example, the energy management system 112 may monitor energy generation by the electric generator 108, remaining energy storage capacity of the energy storage device 110, rotational speed of the LP shaft(s) or spool(s) 226 and/or the HP shaft(s) or spool(s) 224, etc. . . .

It should also be appreciated that, as used herein, the term "energy management system" generally refers to any suitable computing device and/or processing unit known in the art. As such, the energy management system 112 described herein may, for example, include one or more processor(s) and associated memory device(s) configured to perform a variety of computer-implemented functions (e.g., performing the various functions described herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits.

Additionally, the memory device(s) included within a given controller may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the associated energy management system 112 to perform various functions, such as monitoring energy generation by the electric generator 108, monitoring and/or calculating remaining energy stored in the energy storage device 110, rate of energy consumption by the BLI fan 106 and other system variables.

Figure 6:
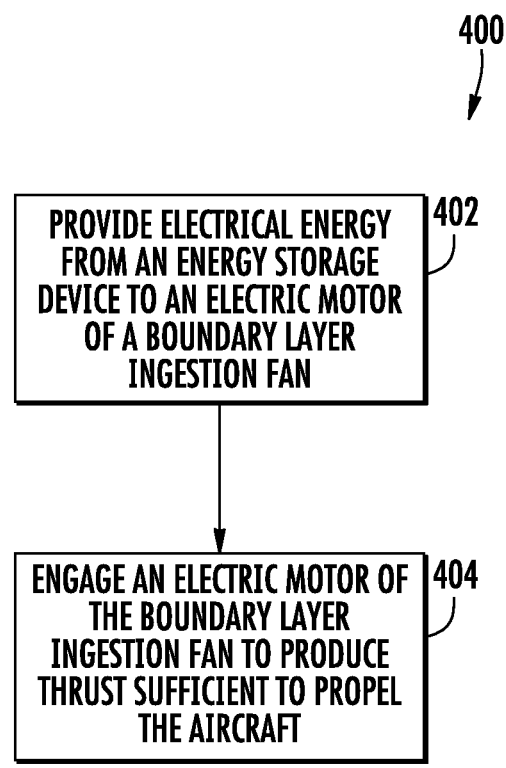
FIG. 6 is a flow diagram of an exemplary method for propelling an aircraft via a gas-electric propulsion system as shown in FIG. 5, according to various embodiment of the present subject matter.

It should be appreciated by one of ordinary skill that the various embodiments described and illustrated herein may provide a method for propelling the aircraft 10 via the gas-electric propulsion system 100. FIG. 6 provides a flow diagram of an exemplary method 400 for propelling the aircraft 10 via the gas-electric propulsion system 100. At 402, method 400 includes providing electrical energy from the energy storage device 110 to the electric motor 304 of the boundary layer ingestion fan 106, 300, wherein the boundary layer ingestion fan 106, 300 is mounted to the aircraft 10 aft of the wing 20. At 404, method 400 includes engaging the electric motor 304 to rotate the fan blades 308 of the boundary layer ingestion fan 106, 300 to produce thrust sufficient to propel the aircraft 10.

In other embodiments, method 400 may further include providing electrical energy to the energy storage device 110 via electric generator 108. Method 400 may include providing electrical energy to the energy storage device 110 via a high pressure electric generator that is coupled to the high pressure spool 224 of the turbofan jet engine 200. In one embodiment, method 400 may include providing the electrical energy to the energy storage device 110 via a low pressure electric generator that is coupled to the low pressure spool 226 of the turbofan jet engine 200. In one embodiment, method 400 may include providing additional thrust to propel the aircraft via one or more of the jet engines 102, 104. In particular embodiments, method 400 may include providing electrical energy directly to the boundary layer ingestion fan 106, 300 via high pressure electric generator that is coupled to the high pressure spool 224 of the turbofan jet engine 200. In particular embodiments, method 400 may include providing electrical energy directly to the boundary layer ingestion fan 106, 300 via low pressure electric generator that is coupled to the low pressure spool 226 of the turbofan jet engine 200.

The gas-electric propulsion system 100 as described herein and as illustrated in the referenced figures provides various technical benefits over conventional aircraft propulsion systems. For example, in various embodiments, the boundary layer ingestion fan decreases the aircrafts drag by re-energizing the fuselage boundary layer, thus enabling reduced thrust requirements for the under-wing turbofans. As a result, reduced fan pressure ratio at a given turbofan engine diameter is required, thus increasing the propulsive efficiency of the propulsion system.

By having a high specific power LP generator and/or high specific power fan motor 304 in conjunction with the energy storage devices 110, the BLI fan 108 may be used to taxi the aircraft, thus reducing overall fuel burn. In addition or in the alternative, by having a high specific power HP electric generator and/or fan motor 304, core power extraction may be used to raise the HP compressor operating line at cruise, thus providing increased overall system efficiency. In addition or in the alternative, the high specific power HP electric generator and/or fan motor 304 may eliminate a starter/generator typically required for the turbofan jet engines 102, 104, may eliminate a requirement for a Ram Air Turbine (RAT), eliminate the need for a Fan Mounted Accessory Gear Box (AGB) to provide power to the BLI fan 108, may eliminate TBV, may enable electric anti-ice and Environmental Control System (ECS) and may provide an improved alternative for engine re-light by utilizing the BLI fan to drive associated generators.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas-electric propulsion system for an aircraft, the system comprising:
 a pair of jet engines suspended beneath a wing of the aircraft;
 an electric powered boundary layer ingestion fan fixedly connected to a fuselage portion of the aircraft aft of a tail section; and
 an electric generator coupled to at least one of the pair of jet engines and to the boundary layer ingestion fan, wherein the electric generator converts rotational energy from at least one jet engine of the pair of jet engines to electrical energy;
 wherein the boundary layer ingestion fan is powered only by the electrical energy generated by the electric generator; and
 wherein the boundary layer ingestion fan is configured to provide sufficient thrust to independently propel the aircraft.

2. The system as in claim 1, wherein each jet engine of the pair of jet engines is a high-bypass ratio turbofan jet engine.

3. The system as in claim 2, wherein the high-bypass ratio turbofan jet engines include a fan section having a plurality of fan blades, wherein the fan blades are variable or fixed pitch.

4. The system as in claim 2, wherein the high-bypass ratio turbofan jet engines are at least one of geared or direct drive.

5. The system as in claim 1, wherein the boundary layer ingestion fan includes an electric motor electronically coupled to the electric generator.

6. The system as in claim 5, wherein the electric motor is a superconductivity electric motor.

7. The system as in claim 1, wherein the electric generator is a high pressure electric generator and is coupled to a high pressure spool of at least one jet engine of the pair of jet engines.

8. The system as in claim 1, wherein the electric generator is a low pressure electric generator and is coupled to a low pressure spool of at least one jet engine of the pair of jet engines.

9. The system as in claim 1, further comprising an energy storage device electronically coupled to the electric generator and to the boundary layer ingestion fan.

10. The system as in claim 1, wherein the system further includes an energy storage device electronically coupled to the electric generator and to the boundary layer ingestion fan, wherein the energy management system is electronically coupled to one or more of the pair of jet engines, the electric generator, the boundary layer ingestion fan and the energy storage device.

11. A gas-electric propulsion system for an aircraft, the system comprising:
- a turbofan jet engine;
- an electric powered boundary layer ingestion fan coupled to a fuselage portion of the aircraft, wherein the boundary layer ingestion fan is coupled to the fuselage downstream from a tail section of the aircraft; and
- an electric generator coupled to the turbofan jet engine and to the boundary layer ingestion fan, wherein the electric generator converts rotational energy from the turbofan jet engine to electrical energy;
- wherein the boundary layer ingestion fan is powered only by the electrical energy generated by the electric generator; and
- wherein the boundary layer ingestion fan is configured to provide sufficient thrust to independently propel the aircraft.

12. The system as in claim 11, wherein the turbofan jet engine is a high-bypass ratio turbofan jet engine which includes a fan section having a plurality of fan blades, wherein the fan blades are variable or fixed pitch.

13. The system as in claim 12, wherein the high-bypass ratio turbofan jet engine is one of a geared or direct drive turbofan jet engine.

14. The system as in claim 11, wherein the boundary layer ingestion fan includes an electric motor electronically coupled to the electric generator.

15. The system as in claim 14, wherein the electric motor is a superconductivity electric motor.

16. The system as in claim 11, wherein the electric generator is a high pressure electric generator and is coupled to a high pressure spool of the turbofan jet engine.

17. The system as in claim 11, wherein the electric generator is a low pressure electric generator and it coupled to a low pressure spool of the turbofan jet engine.

18. The system as in claim 11, further comprising an energy storage device electronically coupled to the electric generator and to the boundary layer ingestion fan.

19. The system as in claim 18, wherein the energy storage device comprises batteries.

20. The system as in claim 11 wherein the system further includes an energy storage device electronically coupled to the electric generator and to the boundary layer ingestion fan, wherein the energy management system is electronically coupled to one or more of a pair of jet engines, the electric generator, the boundary layer ingestion fan and the energy storage device.

21. The system as in claim 1, wherein an inlet of the electric powered boundary layer ingestion fan is oriented with respect to the fuselage to ingest at least a portion of a boundary layer flow of air that is formed along the outer surface of the fuselage during flight.

22. The system as in claim 11, wherein an inlet of the boundary layer ingestion fan is oriented with respect to the fuselage to ingest at least a portion of a boundary layer flow of air that is formed along the skin of the fuselage during flight.

23. The system as in claim 1, further comprising an energy management system configured or programmed to monitor various system conditions.

24. The system as in claim 11, further comprising an energy management system configured or programmed to monitor various system conditions.

* * * * *